(12) United States Patent
Chiang (10) Patent No.: US 10,681,430 B2
(45) Date of Patent: Jun. 9, 2020

(54) SMART TV WITH CLOUD SERVICE (71) Applicant: Kuo-Ching Chiang, New Taipei (TW)

(72) Inventor: Kuo-Ching Chiang, New Taipei (TW)

(*) Notice: Subject to any disclaimer, the term of this patent is extended or adjusted under 35 U.S.C. 154(b) by 0 days.

(21) Appl. No.: 16/051,675

(22) Filed: Aug. 1, 2018

(65) Prior Publication Data

US 2018/0338114 A1 Nov. 22, 2018

Related U.S. Application Data

(63) Continuation-in-part of application No. 14/642,740, filed on Mar. 9, 2015, now abandoned, which is a continuation of application No. 11/724,262, filed on Mar. 15, 2007, now abandoned, which is a continuation-in-part of application No. 11/011,465, filed on Dec. 13, 2004, now abandoned.

(51) Int. Cl.
*G03B 17/24* (2006.01)
*H04N 21/81* (2011.01)
*H04N 21/431* (2011.01)
*H04N 7/18* (2006.01)
*H04N 21/4415* (2011.01)
*H04N 21/418* (2011.01)
*H04M 1/725* (2006.01)

(52) U.S. Cl.
CPC ............. *H04N 21/812* (2013.01); *H04N 7/18* (2013.01); *H04N 21/4182* (2013.01); *H04N 21/4316* (2013.01); *H04N 21/4415* (2013.01); *H04M 1/7253* (2013.01)

(58) Field of Classification Search
USPC .......................................................... 396/321
See application file for complete search history.

(56) References Cited

U.S. PATENT DOCUMENTS

| | | | | |
|---|---|---|---|---|
| 9,554,084 | B2* | 1/2017 | Lee ...................... | H04N 7/0122 |
| 9,727,661 | B2* | 8/2017 | Kim ...................... | H04L 61/103 |
| 10,390,099 | B2* | 8/2019 | Medina .............. | H04N 21/6473 |
| 2012/0304238 | A1* | 11/2012 | Rivera ................. | H04N 21/643 |
| | | | | 725/110 |
| 2014/0024341 | A1* | 1/2014 | Johan ............... | H04N 21/25816 |
| | | | | 455/411 |
| 2014/0049691 | A1* | 2/2014 | Burdzinski ............. | G06F 3/017 |
| | | | | 348/563 |
| 2014/0053180 | A1* | 2/2014 | Shoykher ................. | H04N 5/50 |
| | | | | 725/14 |

(Continued)

OTHER PUBLICATIONS

IOS 9 User Guide: https://books.apple.com/us/book/ipad-user-guide-for-ios-9-3/id1035374126, Jun. 8, 2015. (Year: 2015).*

(Continued)

*Primary Examiner* — Rodney E Fuller
(74) *Attorney, Agent, or Firm* — Chih Feng Yeh; Huntington IP Consulting Co., Ltd.

(57) ABSTRACT

A smart TV includes a control IC; a display coupled to the control IC; a memory coupled to the control IC to store data; a subscriber identity module (SIM) coupled to the control IC to identify a subscriber; and a cloud server wireless transceiver coupled to the control IC to omit an internet; wherein the cloud server wireless transceiver transmits or receives the data to or from a remote terminal with cooperation of the subscriber identity module (SIM).

20 Claims, 6 Drawing Sheets

(56) References Cited

U.S. PATENT DOCUMENTS

| | | | |
|---|---|---|---|
| 2014/0282687 A1* | 9/2014 | Kummer | H04N 21/2393 725/31 |
| 2015/0195604 A1* | 7/2015 | Synowiec | H04N 21/41 361/679.22 |
| 2015/0304336 A1* | 10/2015 | Yu | H04L 63/102 726/4 |
| 2016/0034240 A1* | 2/2016 | Kreiner | G06F 3/1446 348/383 |
| 2016/0219000 A1* | 7/2016 | Park | H04L 51/046 |
| 2016/0342241 A1* | 11/2016 | Chung | G06F 3/0416 |
| 2018/0102106 A1* | 4/2018 | Shintani | G09G 5/10 |
| 2018/0288208 A1* | 10/2018 | Lee | G06F 1/1683 |
| 2018/0335903 A1* | 11/2018 | Coffman | G06F 3/0482 |
| 2019/0246161 A1* | 8/2019 | Lim | G06F 1/16 |
| 2019/0379945 A1* | 12/2019 | Rivera | H04N 21/6181 |

OTHER PUBLICATIONS

IPad Air Technical Specifications: https://support.apple.com/kb/sp692?locale=en_US, Nov. 1, 2013. (Year: 2013).*

Wikipedia 5G, https://en.wikipedia.org/wiki/5G, Jul. 22, 2019 (Year: 2019).*

* cited by examiner

SMART TV WITH CLOUD SERVICE

CROSS REFERENCE TO RELATED APPLICATIONS

The application is a continuation-in-part application of application Ser. No. 14/642,740, filed on Mar. 9, 2015, which is continuation application of application Ser. No. 11/724,262, filed on Mar. 15, 2007, which is a continuation-in-part application of application Ser. No. 11/011,465, filed on Dec. 13, 2004.

TECHNICAL FIELD

The present invention relates generally to a smart TV, and especially to a TV which offers the direct wireless cloud service.

BACKGROUND OF RELATED ARTS

Because of the development of the information technology (IT), the information could be exchanged with higher capacity and faster speed. Internet is designed as an open structure to exchange information freely without restriction. The third generation mobile phone standard allows the user to access video communication through the air. Thus, certain communication service requiring real time information exchange, such as viewing a live video, has become feasible through mobile phone communication network or Internet. Portable computers and personal computer or smart phone have been widely used for each area. Laptop (notebook) and tablet style computers may be found in the work environment, at home or used during travel, perhaps as a result of their advantages, particularly when equipped with wireless communicating technology. Advantages such as low power consumption, small size, low weight make the portable computer available to nearly everyone everywhere. Smart TV is a new product for nowadays as well.

A problem arisen from the smart TV is that the current smart TV only has a short distance wireless transmitting/receiving module such as a Wi-Fi module, which has to be connected with an access point first so as to connect Internet. Thus, if there is no access point available, the conventional smart TV will not be able to connect Internet wirelessly. It is inconvenient to the consumer.

It would therefore be desirable to provide a new smart TV which can solve the aforementioned problem.

SUMMARY

The present invention provides many additional advantages which shall become apparent as described below.

The object of the present invention is to provide a smart TV with a SIM (subscriber identity module) card connector.

In one aspect, the present invention provides a smart TV including: a control IC; a display coupled to the control IC; a memory coupled to the control IC to store data; a subscriber identity module (SIM) coupled to the control IC to identify a subscriber; and a cloud server wireless transceiver coupled to the control IC to omit an internet; wherein the cloud server wireless transceiver transmits or receives the data to or from a remote terminal with cooperation of the subscriber identity module (SIM). In one aspect, the present invention provides a smart TV including a control IC; a display coupled to the control IC; a TV program receiver coupled to the control IC to receive a TV program signal to the display; a streaming TV module coupled to the control IC to receive a cloud data stream to the display, wherein the streaming TV module includes a cloud server login security generator; a data sharing receiver coupled to the display to display a sharing data from a portable terminal; and a cloud server transceiver coupled to the streaming TV module to receive the cloud data stream from a remote terminal.

In one embodiment, the smart TV may further include a display dividing module coupled to the control IC to divide the display into multiple display windows. In one embodiment, the smart TV may further include a TV communication module coupled to the control IC. A streaming TV program, and an interface of the TV communication module may be assigned into the multiple display windows. The TV communication module may include an instant chat module or a wireless TV phone module, wherein a user is allowed to conduct a call or chat with the remote terminal while watching the streaming TV program. A sub-display window of the multiple display windows may be employed to display advertisement. In one embodiment, the multiple display windows may include at least one main window and at least one sub-window. A streaming TV program may be assigned into the main window and the interface may be assigned into the sub-window, and the streaming TV program may be re-assigned into the sub window and the interface may be re-assigned into the main window. The smart TV may further include a memory coupled to the control IC to store data, and a multi-tasking module coupled to the control IC for reassigning the control IC between at least one task and another task to achieve parallelism. In one embodiment, the streaming TV program may be assigned into the sub window and the interface may be assigned into the main window, and the streaming TV program may be re-assigned into the main window and the interface may be re-assigned into the sub window. The smart TV may further include a subscriber identity module (SIM) coupled to the control IC to identify a subscriber. In another aspect, the present invention provides a smart TV including: a control IC; a display coupled to the control IC; a TV program receiver coupled to the control IC to receive a TV program signal to the display; a streaming TV module coupled to the control IC to receive a cloud data stream to the display; a subscriber identity module (SIM) coupled to the control IC to identify a subscriber; and a cloud server transceiver coupled to the streaming TV module to receive the cloud data stream from a remote terminal. In one embodiment, the SIM includes at least 45G standard SIM. In one embodiment, the smart TV may further include a multi-tasking module coupled to the control IC for reassigning the control IC between at least one task and another task to achieve parallelism. In one embodiment, the smart TV may further include a user motion control module coupled to the control IC. In one embodiment, the smart TV may further include a bio-characteristic capturing device and a bio-security code generator. In one embodiment, the SIM may include an electrical SIM. In one embodiment, the SIM may include a SIM card which is inserted into a SIM connector. In still another aspect, the present invention provides a smart TV including: a control IC; a display coupled to the control IC; a TV program receiver coupled to the control IC to receive a TV program signal to the display; a streaming TV module coupled to the control IC to receive a cloud data stream to the display; a remote computer access module coupled to the control IC to access a remote computer; and a cloud server transceiver coupled to the streaming TV module to receive the cloud data stream from a remote terminal.

BRIEF DESCRIPTION OF THE DRAWINGS

FIG. 1C (a) and FIG. 1C (b) show the wireless memory according to the present invention.

FIG. 1C (c) shows the hybrid non-volatile memory according to the present invention.

DETAILED DESCRIPTION

Figure 1A:
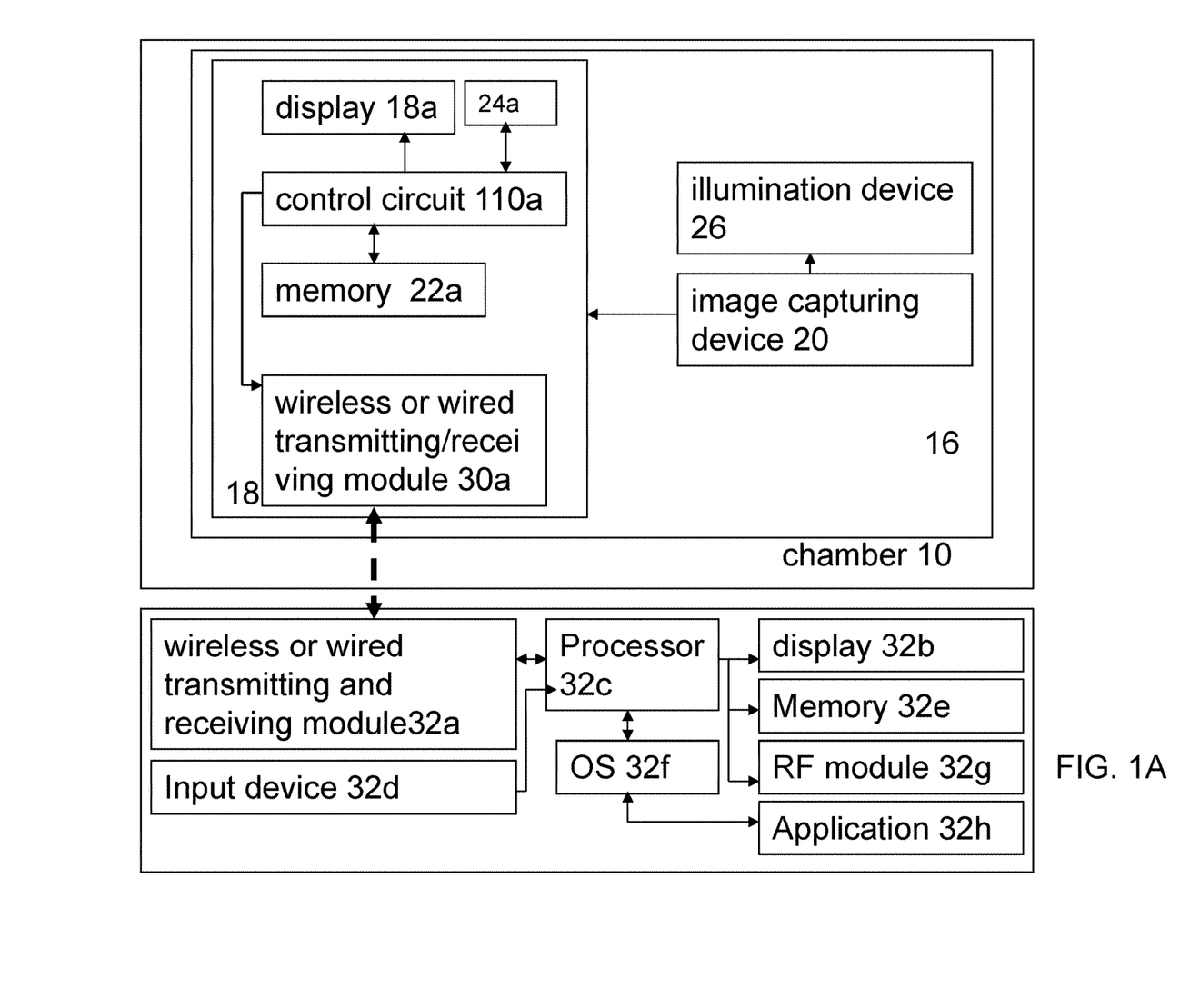
FIG. 1A shows a function diagram according to the present invention.
Figure 1B:
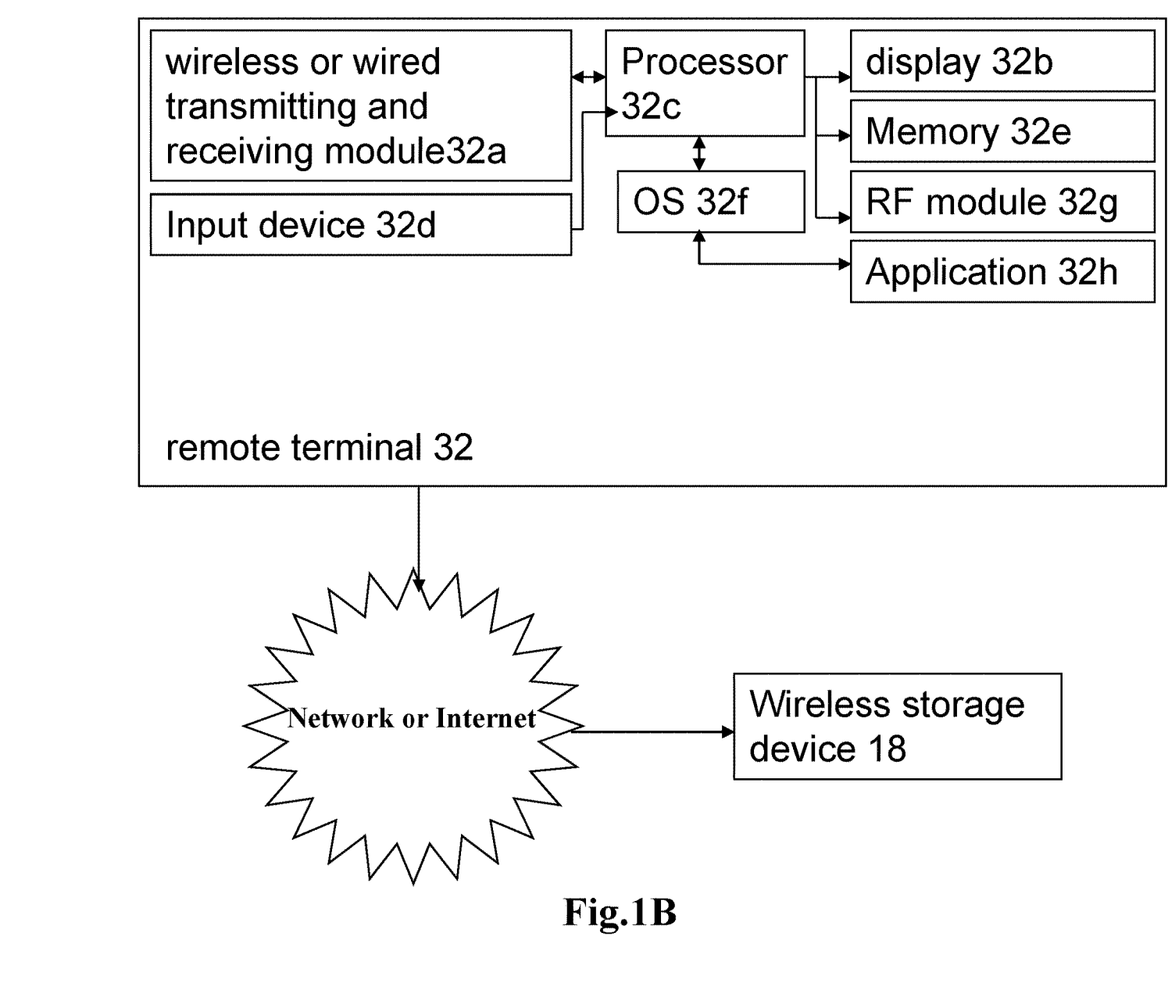
FIG. 1B shows a function diagram according to the present invention.
Figure 1C:
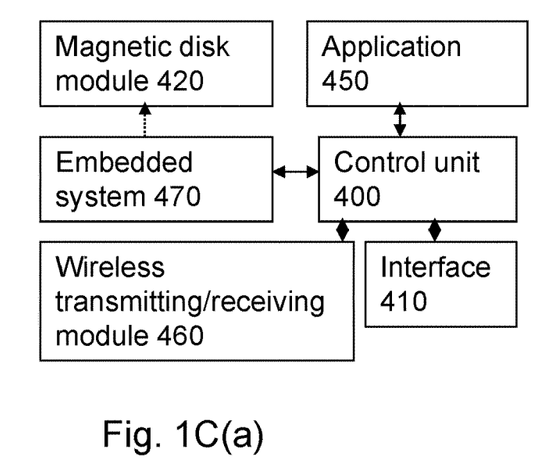

The following description is provided to enable any person skilled in the art to make and use the invention. Various modifications, however, will remain readily apparent to those skilled in the art, since the generic principles of the present invention have been defined herein specifically to provide an overall method and devices for a food storage tracking system. FIGS. 1A and 1B show an illustration and a block diagram of the present invention. Almost of the elements and description of Please refer to FIGS. 1A and 1B, a memory 22a is provided with an embedded wireless transmitting/receiving module 30a and a control unit 110a is coupled to the memory 22a with the wireless transmitting/receiving module 30a to process the command, signal and instruction from the user. A display panel 18a is equipped and coupled to the control unit 110a. The wireless memory 18 includes the memory 22a, the control unit 110a and the wireless transmitting/receiving module 30a, it may refer to wireless storage device or wireless memory. One or more image capturing device 20a is set and the image capturing device and illumination device can be incorporated in a case 16 of a portable device with the image capturing device 20a. The image capturing device 20a is electrically (or optically) coupled to the display panel 18a, control circuits 110a. The image capturing device 20a is set in the case 16. An illumination device 26a is set to provide the illumination for the image capturing device 20a when the environment is dark for the image capturing device 20a takes an image or shooting. The image capturing device 20a and the illumination device 26a could be built-in together. The image capturing device 20a could capture the image, therefore, the image of the items could be taken or shot by the image capturing device 20a. The image capturing device 20a could be, for example, CCD, or CMOS sensor. The illumination device 26a could be LED, IR ray source or the like. When the image capturing device 20a is on, the image can be captured and send it to the display panel 18a, thereby displaying captured image in the form of video or picture on the display 18a. In one embodiment, a LCD screen is provided for the display panel to display. Other type display could also be used such as plasma display panel, LED display panel, FED display panel, EL panel, OEL and OLED panel. A low-power CMOS (complementary metal oxide semiconductor) microprocessor with integral FLASH maybe employed. A molded plastic case for the screen encloses the circuit board. Power is provided by wired power source or batteries. The image capturing device 20a includes a charged coupled device (referred to as "CCD") or CMOS. Further, the image capturing device 20a has the zoom-in and zoom-out functions controlled by the user. Memory 22a refers to nonvolatile memory or magnetic storage device, for example hard disk. The memory 22a is coupled to the image capturing device 20a for storing a captured data such as single frame image or video data, wires are used to connect the control circuits 110a, power source and the display 18a. The memory could be FLASH. Corresponding driving circuits may be incorporated into or separated from the control circuits 110a. The flash memory could be replaced by other NVM (non-volatile memory) such as NROM (nitride-ROM), SONOS or MRAM, FRAM. An interface 24a coupled to the control circuits 110a may be provided to the wireless storage device 18 for transferring data. The wireless transmission/receiving module 30a can perform such function as well. Under the architecture, the wireless storage device 18 may refer to a wireless Flash memory card or drive. The wireless storage device 18 can act as the separated data storage for other device such as computer, notebook, tablet, mobile phone, digital camera, PDA, medium player. The wireless Flash card may be separable from the portable device. Please be noted that the wireless storage device 18 may be inserted into the computer, notebook, tablet, mobile phone, digital camera, PDA, medium player. The image capturing device 20a is available to catch image of an object. Another embodiment of the present invention further includes a wireless or wired transmission/receiving module 30a coupled to the image capturing device 20a and the control circuit 110a. The wireless or wired transmission/receiving module 30a could be set adjacent to the display panel 18a. It should be noted, it is not the only way to set the wireless or wired transmission/receiving module. The transmission/receiving module could be the wireless transmission/receiving module that is compatible with blue-tooth, 802.11, WiFi, WiMAX standard. The transmission domain (the air) by nature is not secured and therefore pair-wise matching maybe necessary in the wireless transport networks. In one embodiment, pair-wise (encryption/decryption) procedure between every neighboring wireless network device of a wireless transport network is needed. A data frame that leaves from one wireless device from one end of a wireless transport network to the other end of the same network might need several encryptions and decryptions before it reaches its final destination. Furthermore, a group key for a broadcast or a multicast data frame maybe needed in addition to pair-wise encryption keys. An AP may be needed for Wi-Fi device to couple to the internet network. In a preferred embodiment, take the RF module as an example, as known in the art, the RF (wireless transmission/receiving) module includes an antenna connected to a transceiver which is used to receive and transmit signal. As know, the RF module may further include, base band processing unit, DSP and A/D converter. Due to the RF module is not the feature of the present invention, therefore, the detailed description is omitted. The captured image can be transmitted through the RF module 30 by operation frequency while the image capturing device is in function. The RF module could be compatible with 3G, 4G or 5G standard. The captured result can be send to another user terminal 32 with a wireless transceiver (wireless transmitting and receiving module) 32a and a display screen 32b, thereby allowing the user to share the image. The user terminal 32 could be, such as computer system, portable device (cellular), PDA, notebook, smart phone or TV set. The signal could be transmitted or received through wireless transmission. In another case, the transmission is achieved through WiMAX network or WiFi. The instruction is sent via the wired network or wireless network through WLAN. If the WiFi is used, the data may be transferred through wireless.

If the user terminal 32 includes a cellular or smart phone, a further RF module 32g is incorporated into the terminal 32 for transmitting and receiving communication data. The signal is transmitted from a user terminal 32 to the image capturing device through the mobile phone network by RF module 32g or the transmission/receiving module 32a. It could be transmitted by 4G, 5G or higher level protocol or standard. Alternatively, it could be transmitted by wireless transmitting and receiving module with WiFi, WiMAX, 902.11 or Bluetooth specification. The control circuit 110a will sent the captured image to the user another terminal 32 through the wireless transmitting and receiving module 30a and received by the wireless transmitting and receiving module 32a, as shown in FIG. 1A. Alternatively, the present invention may access the data or captured data stored in the memory 22a from the remote terminal. The user terminal 32 such as mobile phone, may sent a signal to the device through wireless transmitting and receiving module 32a and received by the wireless transmitting and receiving module 30a, followed by sending the signal to the control circuits 110a. The control circuits 110a may fetch the required data stored in the memory 22a and send the required data to the remote terminal 32 wirelessly.

If there are pluralities of device under control, the user may remote control each device as shown in FIG. 1B. The connection manager coordinates communication between WiMAX or WiFi wireless communication protocol and facilitate communication over the wireless communication network. An application is able to coordinate and establish a communication path over WiMAX wireless network for purposes of transferring data. In order to access the data from a remote distance, it prefers that the storage device can be accessed wireless or the data stored therein can be transferred wireless from a remote terminal. Thus, the present invention provides a wireless storage device such as hard disk or flash drive as shown in FIG. 1C (a), the wireless storage 18 scheme can be referred to FIG. 1A. The wireless hard disk drive or flash drive can be accessed by wireless control from separated device. The wireless transmitting/receiving module 460 maybe coupled to the control unit for wireless data transfer. Preferably, share mode application 450 coupled to the control unit 400 is required to achieve the purpose. The application 450 maybe software, hardware or firmware used to share the information through air. In one case, it may be a sharing module or program. The cross-platform file and print sharing made easy, it is a sharing module. The application is a solution for sharing between the different devices or platforms, with bi-directional, allowing device to browse file in the wireless storage device through air, as well as share your images for others to access. Optionally, the present invention also provides a hard disk drive having a Flash memory, as shown in FIG. 1C (b) to have the benefits of both. The hard disk drive includes a control unit 400 coupled to an interface 410 and a magnetic disk module having spindle driver 420, reading/writing head mechanism and so on. This is well-known in the art, the description is omitted. A flash controller 440 is coupled to the control unit 400 and a nonvolatile memory 430 is coupled to the flash controller 440. An application 450 is coupled to the control unit to execute the instruction. A wireless transmitting/receiving module 460 maybe coupled to the control unit for wireless data transfer. The wireless hard drive incorporates the flash memory into the device to yield the benefit of high-speed access and low power consumption. The hard disk drive maybe incorporated into portable media player, cellular, notebook or PDA. A controller 440 is connected to the flash memory 430 to operate the mode under instruction or command. The operation mode includes read mode, write mode, erase mode, and programming mode. The controller 430 is capable to process the USB protocol if the interface includes USB interface. Further, the controller 440 maybe integrated into the control unit 400 under the knowledge and technology of integrated circuits. An embedded system 470 is optionally stored in the erasable/programmable storage medium (flash, ROM or hard disk). It could be OS, simplified OS, an application, software or a list of computer-executable instructions. The embedded system 470 is preferably in a ROM (read only memory) 480 and is another individual memory array separated from the Flash array and coupled to the control unit 400. Alternatively, the ROM 480 may be embedded in the control unit. The data coded in the ROM will not be erased by the user. The embedded system 470 could be provided for a computer or device to execute predetermined function such as operating some application, booting the device, auto backup or auto-run file. In general, after a device is power on, basic input/output system will perform a boot sequence before invoking the OS. Basic input/output system is set in the ROM. During the procedure, the BIOS will detect the priority of the boot up application. The user may set the BISO so as to let the device is boot up by an application stored in a floppy, CD-ROM, DVD drive or other I/O port coupled with a periphery device. In one application of the present invention, we may set the system to be booted by the USB port coupled with the USB drive cording to the present invention. The module could act as "key" for the device. The programmer or instruction can be set in the embedded system to determine what type of data will be stored into what type of storage (flash or hard disk). It could be used for different type of volatile memory having NOR type and NAND type. In one embodiment, the embedded system 470 is OS or simplified OS. The embedded system is coupled to the control unit to determine or assign the duty of the magnetic disk module 420 and the nonvolatile memory 430. The flash benefits high speed performance, low power consumption while hard disk drive yields lower cost. The storage architecture refers to Complementary Storage Device (CSD). The CSD has the benefits of the both type of memory. The manufacture may reduce the cost and increase the performance by incorporating the two kind of memory with an optimized memory ratio between the flash memory and the magnetic memory. The composition of the CDS may follow the following rules to achieve the purpose and the memory ratio maybe fall within the range list below. The calculated method is not the concern of the present invention, the present invention try to predict the ratio range.

Please refer to FIG. 1C(c), the present invention may apply to semiconductor non-volatile memories comprising an array of non-volatile memory cells arranged in a plurality of rows and columns can be characterized as operating either in a NAND mode of operation or a NOR mode of operation. Typically, NAND memory cells are programmed or read to operate in a page mode manner in which a page of data (typically 512 bytes) is stored in a plurality of page buffers that are integrated with the memory circuit device. During programming, a page of data is externally supplied to the NAND device and is stored in the page buffer. From the page buffer, the data is then stored in the NAND cells. In contrast, in a NOR mode of operation, different bytes within the NOR array can be randomly accessed, read or programmed. The difference between the two types is that NOR operation is for random access read or program of a small amount of data faster compared to a NAND program or read operation. NAND operation of program or read is faster than compared to a NOR mode of operation. Conventional flash EEPROM semiconductor memory devices are implemented as either a NOR array or a NAND array. However, a NAND array can advantageously use the tunneling mechanism for both erasing and programming. This provides a much faster erasure than NOR arrays. Thus, while access times are faster in a NOR array, NOR arrays are typically dedicated to applications which require minimal erasure and programming. NAND arrays are suited for storing non-boot code used for data/file manipulation. A storage device comprises a substrate 530; control circuits 520 formed on the substrate 530 to control the reading, writing and erasing of memory cells of the storage device; and a nonvolatile memory array formed on the substrate 530 including NAND type memory array 500 and a NOR type memory array 510 coupled to the control circuits.

Figure 1D:
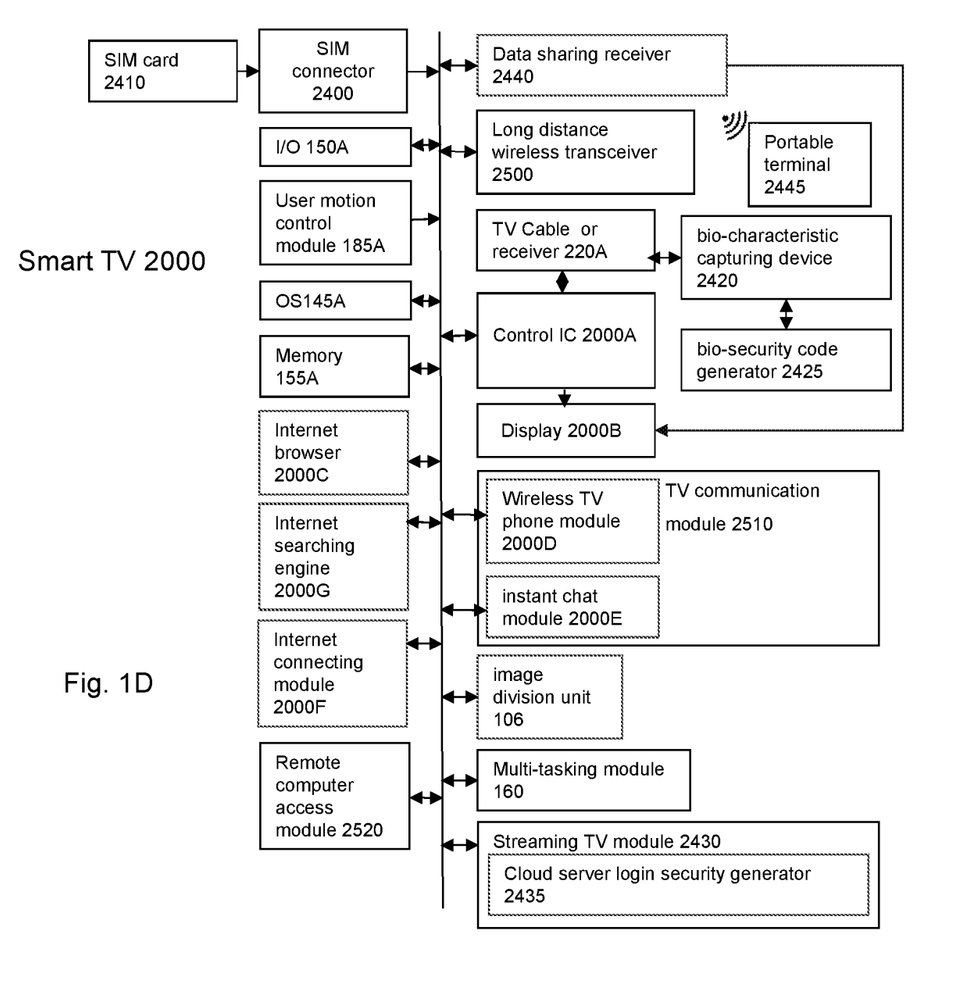
FIG. 1D illustrates a smart TV in accordance with one embodiment of the present invention.
Figure 1E:
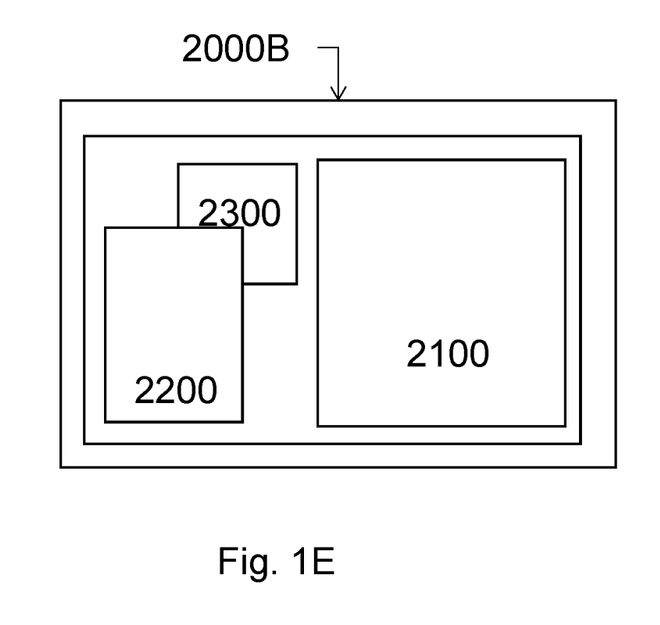
FIG. 1E illustrates a smart TV in accordance with one embodiment of the present invention.

Please refer to FIG. 1D, which illustrates a smart TV in accordance with one embodiment of the present invention. The smart TV shown in FIG. 1D may include the control IC 2000A and a display 2000B. The user motion control module 185A may include a sensor and an IC to detect eye, figure, face motion and generate a control signal. The TV also includes the TV cable or receiver 220A to input the TV program signal, and the tuner and the IR remote control receiver are also necessary, but do not show in the diagram. The TV also includes the Internet browser 2000C and the wireless TV phone module 2000D to allow the user to browse the website, portal, facebook, blog or to conduct the wireless TV phone through the TV, an internet searching engine 2000G to allow the user to couple to the internet through the internet connecting module 2000F. An instant chat module 2000E is also implanted into the TV for the instant on-line chat with other user through the TV. The embodiment also includes a multi-tasking module 160 coupled to the control IC 2000A. The multi-tasking module 160 allows reassigning the control unit from one task to another to achieve parallelism or context switches. Thus, the multi-tasking module 160 may reassign the control unit to switch from one process to another different process to facilitate context switches. For example, a plurality of fed images is transmitted to the multi-tasking module 160 for processing the received images from multi-parties. The images will be processed by the image division unit 106 before sending the image data signals to the display 2000B. Image processing unit maybe employed to adjust the processed image before displaying. Thus, the multi-tasking module 160 may allow the control unit to process the video image from one party to another party; or adjust the processed image of one party and displaying image of the same party. The smart TV 2000 may include an image division unit 106 coupled to the control IC 2000A to divide the displaying area on the display to display the received images synchronously. Therefore, multi-display is achieved as shown in FIG. 1E. The received TV program will be assigned to the divided displaying area, such as main display 2100 on the display; the user interface of internet browser 2000C, the wireless TV phone module 2000D, or the instant chat module 2000E may be assigned to the other divided window display such as sub-display 2200. The assigned window maybe altered by user command such as user figure or hand motion, vocal command or facial express. Therefore, the TV program may be switched to the sub-display; and at least one of the interface of the internet browser, website, the instant chat module or wireless TV phone module may be displayed on the main display window. The present invention may allow the user chat, call the others or browse website while watching the TV program. The other window display may be used for displaying the advertisement at the same time on the residual sub-display 2300. The user interface of the instant chat module or the wireless TV phone module maybe includes the live video of the at least two parties. The user himself maybe displayed on the sub-window display 2200 and the other party is displayed on the sub-window display 2300. The displaying areas may be separated, overlap or partially overlap. The user may alter the arrangement by user figure, finger, hand, vocal control, or facial control. Furthermore, the smart TV 2000 may include a SIM connector 2400 coupled to the control IC 2000A and a long distance wireless transceiver 2500 coupled to the control IC 2000A. The long distance wireless transceiver (cloud server wireless transceiver) 2500 is coupled to an antenna to transmit and receive signal from the remote cloud server. The long distance refers to the signal transmitting distance is longer than the one of Wi-Fi-specification. The SIM connector 2400 receives a SIM card 2410 and is compatible to any kinds of SIM cards, for example 5G standard SIM card, 4G standard SIM card, 4.5G standard SIM card, etc. The long distance wireless transceiver 2500 may transmit or receive images or videos to or from a remote terminal through the SIM card 2410.

The cloud server wireless transceiver 2500 transmits signal to the cloud server and receives signal from the cloud server, directly, without the Wi-Fi apparatus or physical wired internet. Therefore, the TV data-stream can be achieved by the TV structure of the present invention. Furthermore, the instant chat module 2000E or wireless TV phone module 2000D may be performed through the cloud server wireless transceiver 2500 without using the wired internet or Wi-Fi which cannot offer long distance transmission. The SIM card 2410 may be an electrical SIM card which is a digital data and information stored in the memory. Under the configuration, the connector may be omitted.

Figure 2:
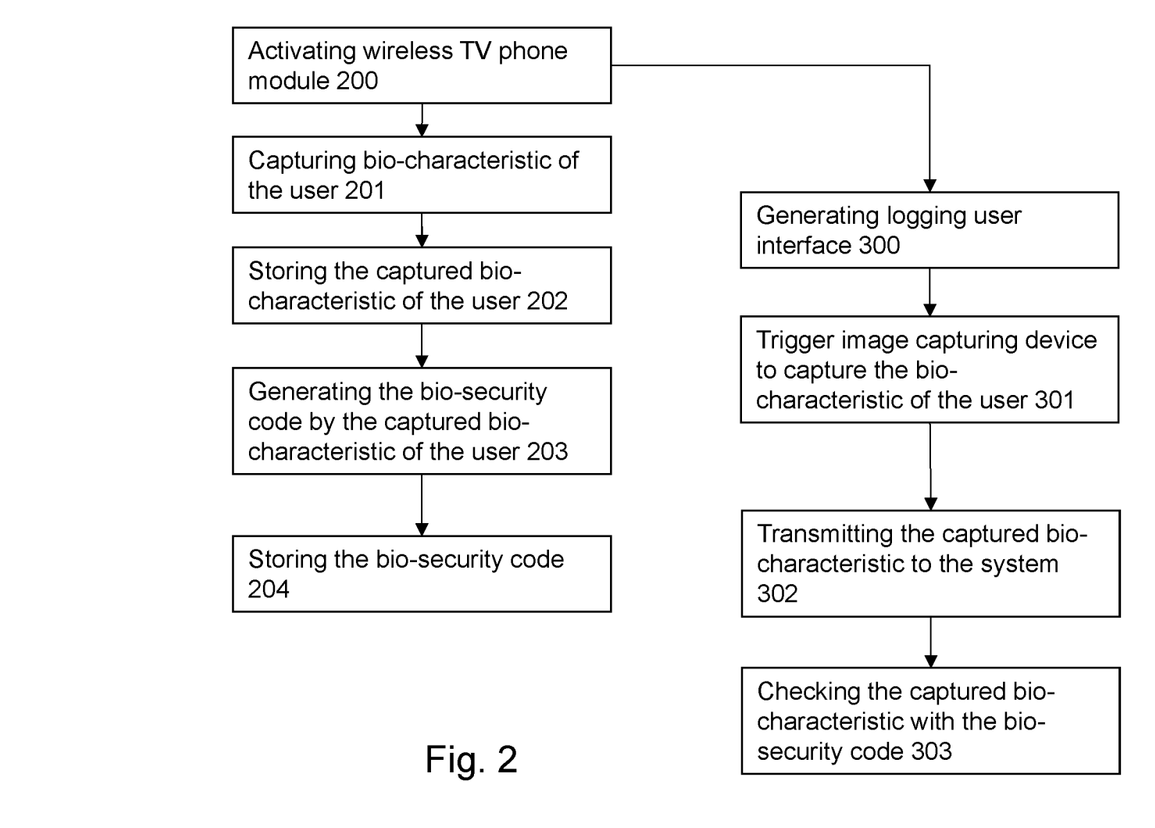
FIG. 2 illustrates a flow chart showing the method of the present invention in accordance with another embodiment of the present invention.

Please refer to FIG. 2, which illustrates a flow chart showing the method of the present invention in accordance with another embodiment of the present invention. The present invention includes a step of activating the wireless TV phone module 2000D from the smart TV in step 200. The next is to prepare the security code for logging the wireless TV phone module 2000D. In one embodiment, the invention introduces the bio-characteristic as the security code instead of text based password. The TV system activates the device to collect the bio-characteristic of the user in step 201. The bio characteristic includes face image, eye image, fingerprint or voice bio-characteristic. The face image, eye image, fingerprint bio-characteristic can be captured by bio-characteristic capturing device 2420, the voice bio-characteristic is collected by microphone. After the template of the bio-characteristic is collected, the bio-characteristic is stored in local system or remote system in step 202, thereby generating the bio-security code by the bio-security code generator 2425 in step 203. Then, the bio-security code is stored in local system or remote system in step 204.

The user may send or receive message to/from the remote server by the wireless TV phone module 2000D with the cooperation of SIM. After the user activates the wireless TV phone module 2000D, the wireless TV phone module 2000D generates and transmits the user interface to the user terminal and displayed on the display in step 300. The user bio-characteristic is captured by the bio-characteristic capturing device 2420 or the microphone in step 301. The user may not input the password and the user account due to the user oneself is actually the real "user account" and "password". The captured bio-characteristic is transmitted to the app or system in the remote server or local system in step 302, followed by comparing the stored bio-security code with the currently captured bio-characteristic by the bio-security code recognition module in the remote server in step 303. Preferably, LED is used to project light at the subject's pupil. Back light from the subject's eye is detected by a sensor. Another method is to detect the user image by the sensor. The sensor could be optical sensor such as CMOS sensor or CCD.

The method associated with the present invention includes the steps of activating the wireless TV phone module 2000D. The electronic system includes text, or audio/video message generator. The next step is to activate the message generator, followed by triggering at least one of the microphone and digital camera or the like. The next step is to generate and prepare the text, audio/video TV phone by the text, or audio/video message generator. Then, the user may transmit the text, or audio/video TV message. A message store provider initiates the sending process, and delivers it to the appropriate transport provider. The transport provider gives the message to its messaging system, which sends it to the intended recipient(s). The receiver may receive the audio message through the output of the speaker and the video signal is displayed on the display. Accordingly, the text message may be shown on the display as well. When the user would like to send the text, audio/video TV phone and input the instruction of creating a new message, the user may initiate the generation of audio/video TV phone by TV phone module 2000D, then inputs the receipt address, or vice versa. The method mentioned above may be employed for the instant chat application for the logging. The bio security also allow the user to login the remote server cloud service employing the SIM and the cloud server wireless transceiver 2500, such as searching, streaming, browsing data. It may be used to login the banking service server for banking service such transaction, payment, etc.

Therefore, the wireless TV phone module 2000D (TV instant chat application) is different from the prior message system. The method can be used for cloud system, web system, instant message system. Alternatively, the present invention may be integrated into the mobile phone terminal, tablet or PDA, thereby allowing the user to receive the message portably, and the user may omit to input the text word or message by one hand. The user may input the message by voice and/or video. If the system is based on the web base, the user may couple to the web mail service provider through the browser before receiving or sending mails.

The user may send a true "password" by bio-characteristics. Thus, it offers better security interface for the user to login the message system. It also may allow the blind people to send a voice mail (message) even if he cannot see the keyboard or touch screen. When the user activates the message or system, the bio-characteristic capturing device will be triggered to automatically fetch the current bio-characteristic of the user, followed by accessing the message or mail system when the system identifies the user. Further, the user may refresh the template by using new captured bio-characteristic. The bio-characteristic may be changed due to the user gets older, for example, the face image maybe changed. Alternatively, the system maybe be set to automatically alter the old bio-characteristic template by new captured bio-characteristic within one predetermined cycle. The user may also remove the bio-characteristic template. Furthermore, the present invention allows the user to enter the cloud service through the TV through the independent SIM and cloud service transceiver to omit the internet.

As will be understood by persons skilled in the art, the foregoing preferred embodiment of the present invention is illustrative of the present invention rather than limiting the present invention. Having described the invention in connection with a preferred embodiment, modification will now suggest itself to those skilled in the art. Thus, the invention is not to be limited to this embodiment, but rather the invention is intended to cover various modifications and similar arrangements included within the spirit and scope of the appended claims, the scope of which should be accorded the broadest interpretation so as to encompass all such modifications and similar structures. While the preferred embodiment of the invention has been illustrated and described, it will be appreciated that various changes can be made therein without departing from the spirit and scope of the invention.

I claim:

1. A smart TV comprising:
a control IC;
a display coupled to said control IC;
a TV program receiver coupled to said control IC to receive a TV program signal to said display;
a streaming TV module coupled to said control IC to receive a cloud data stream to said display, wherein said streaming TV module includes a cloud server login security generator;
a data sharing receiver coupled to said display to display a sharing data from a portable terminal; and
a cloud server transceiver coupled to said streaming TV module to receive said cloud data stream.

2. The smart TV of claim 1, further comprising a display dividing module coupled to said control IC to divide said display into multiple display windows.

3. The smart TV of claim 2, further comprising a TV communication module coupled to said control IC, and an interface of said TV communication module is assigned into said multiple display windows.

4. The smart TV of claim 3, wherein said TV communication module includes an instant chat module or a TV phone module.

5. The smart TV of claim 2, wherein a sub-display window of said multiple display windows is employed to display advertisement.

6. The smart TV of claim 2, wherein said multiple display windows include at least one main window and at least one sub-window.

7. The smart TV of claim 6, wherein a streaming TV program is assigned into said main window or said sub-window.

8. The smart TV of claim 7, further comprising a memory coupled to said control IC to store data, and a multi-tasking module coupled to said control IC for reassigning said control IC between at least one task and another task to achieve parallelism.

9. The smart TV of claim 1, further comprising a subscriber identity module (SIM) coupled to said control IC to identify a subscriber.

10. A smart TV comprising:
a control IC;
a display coupled to said control IC;
a TV program receiver coupled to said control IC to receive a TV program signal to said display;
a streaming TV module coupled to said control IC to receive a cloud data stream to said display;
a subscriber identity module (SIM) coupled to said control IC to identify a subscriber; and
a cloud server transceiver coupled to said streaming TV module to receive said cloud data stream.

11. The smart TV of claim 10, wherein said SIM includes at least 5G standard SIM.

12. The smart TV of claim 10, further comprising a multi-tasking module coupled to said control IC for reassigning said control IC between at least one task and another task to achieve parallelism.

13. The smart TV of claim 10, further comprising a user motion control module coupled to said control IC.

14. The smart TV of claim 10, further comprising a bio-characteristic capturing device and a bio-security code generator.

15. The smart TV of claim 10, wherein said SIM includes an electrical SIM.

16. The smart TV of claim 10, wherein said SIM includes an SIM card which is inserted into a SIM connector.

17. A smart TV comprising:
a control IC;
a display coupled to said control IC;
a TV program receiver coupled to said control IC to receive a TV program signal to said display;
a streaming TV module coupled to said control IC to receive a cloud data stream to said display;
a remote computer access module coupled to said control IC to access a remote computer; and
a cloud server transceiver coupled to said streaming TV module to receive said cloud data stream.

18. The smart TV of claim 17, wherein said streaming TV module includes a cloud server login security generator.

19. The smart TV of claim 17, further comprising a data sharing receiver coupled to said display to display a sharing data from a portable terminal.

20. The smart TV of claim 17, further comprising a subscriber identity module (SIM) coupled to said control IC to identify a subscriber.

* * * * *